(No Model.)
4 Sheets—Sheet 2.
E. KNABE, Jr.
RECIPROCATING ELECTRO MAGNETIC MOTOR.
No. 322,296. Patented July 14, 1885.
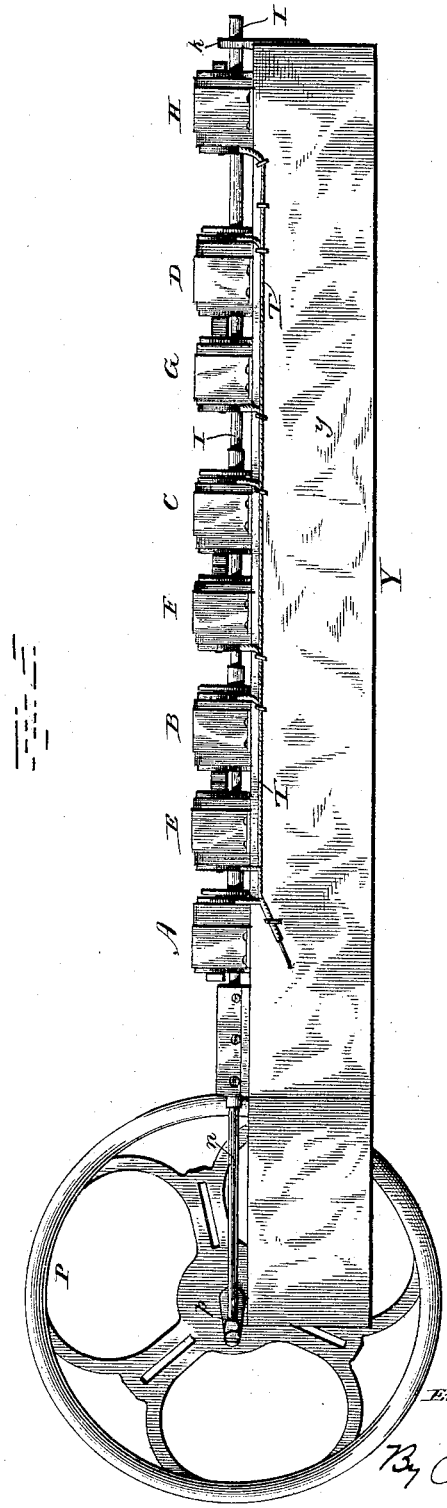
WITNESSES
INVENTOR
Ernest Knabe, Jr.
By Leggett & Leggett
Attorney (No Model.) 4 Sheets—Sheet 3.
E. KNABE, Jr.
RECIPROCATING ELECTRO MAGNETIC MOTOR.
No. 322,296. Patented July 14, 1885.
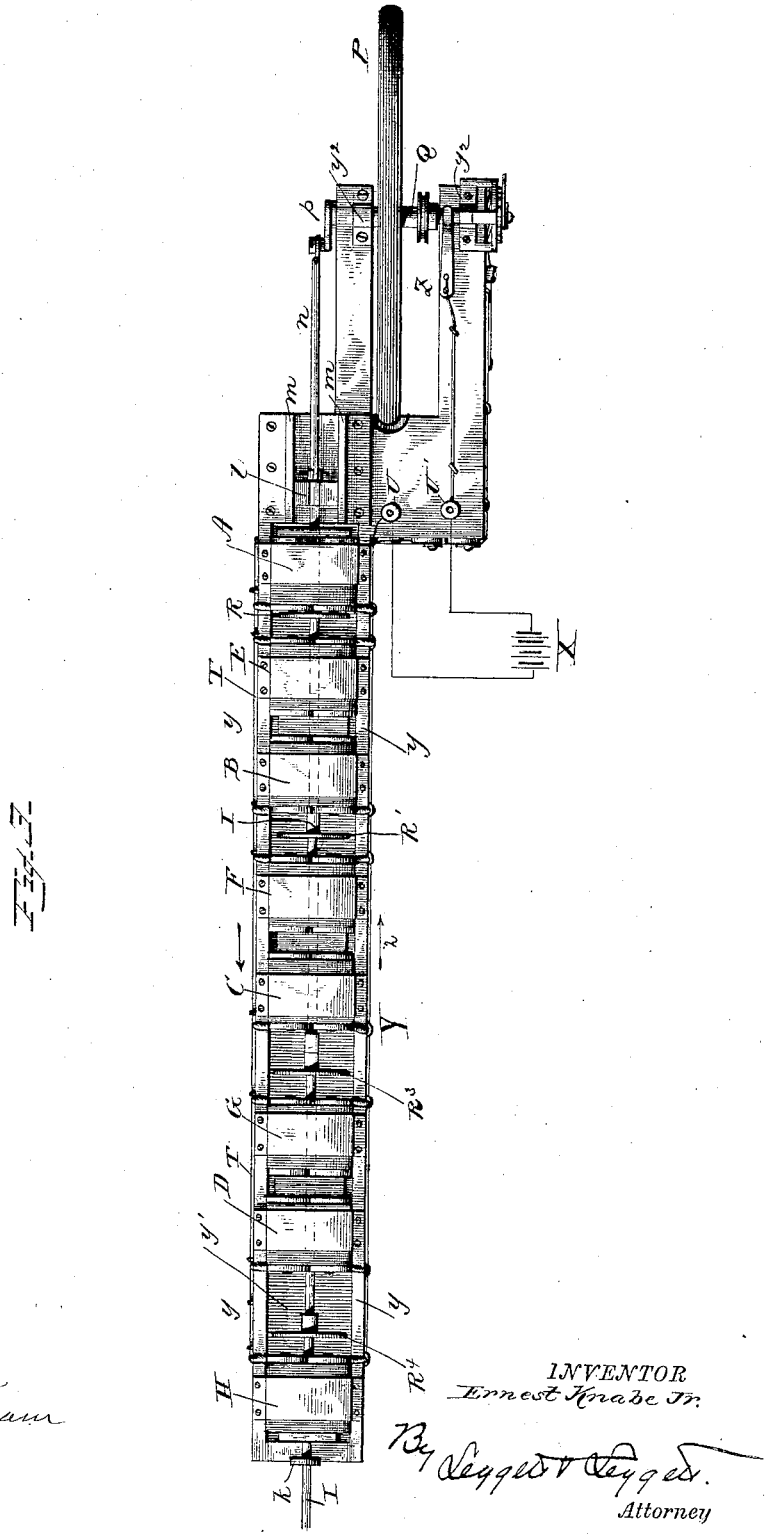

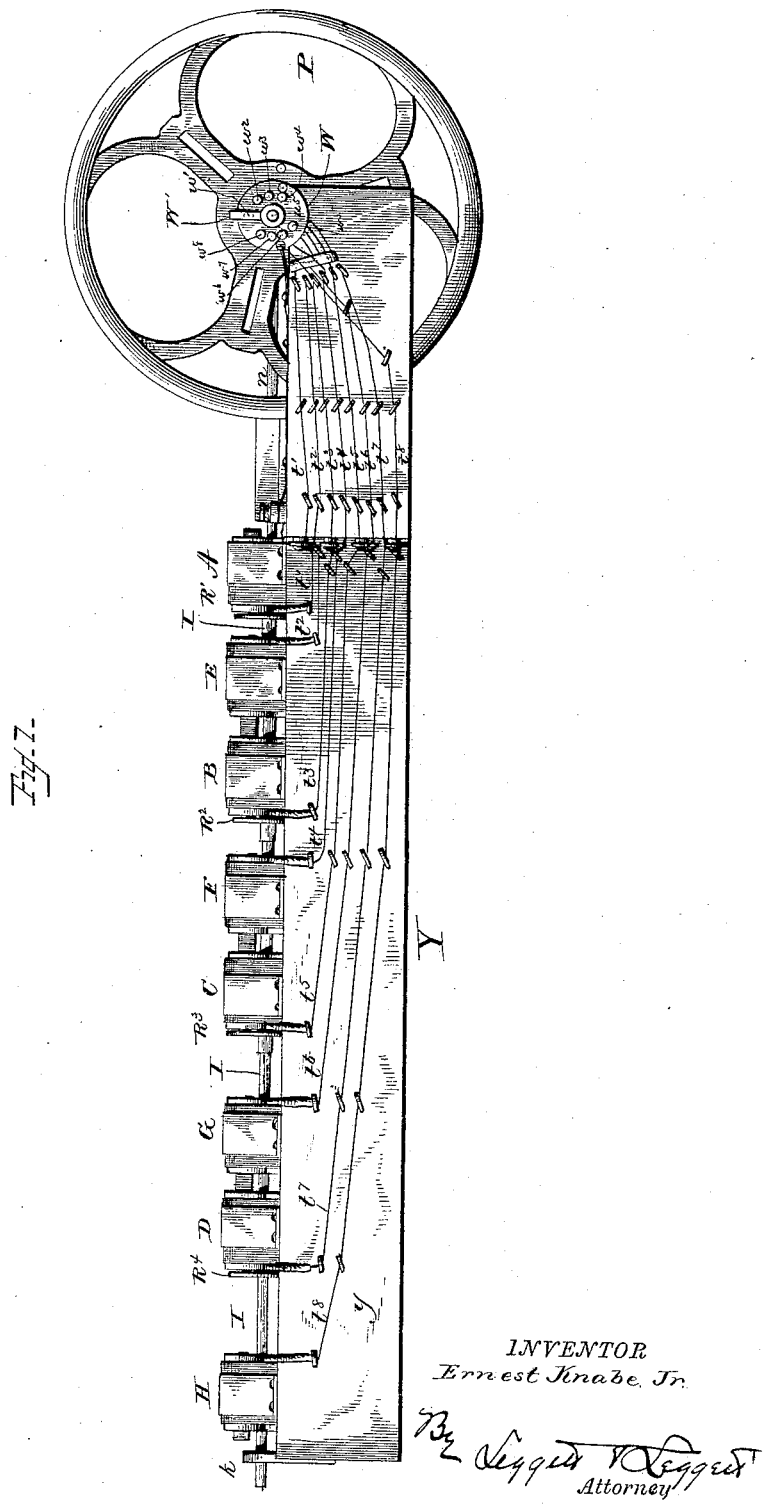

(No Model.) 4 Sheets—Sheet 4.
E. KNABE, Jr.
RECIPROCATING ELECTRO MAGNETIC MOTOR.
No. 322,296. Patented July 14, 1885.
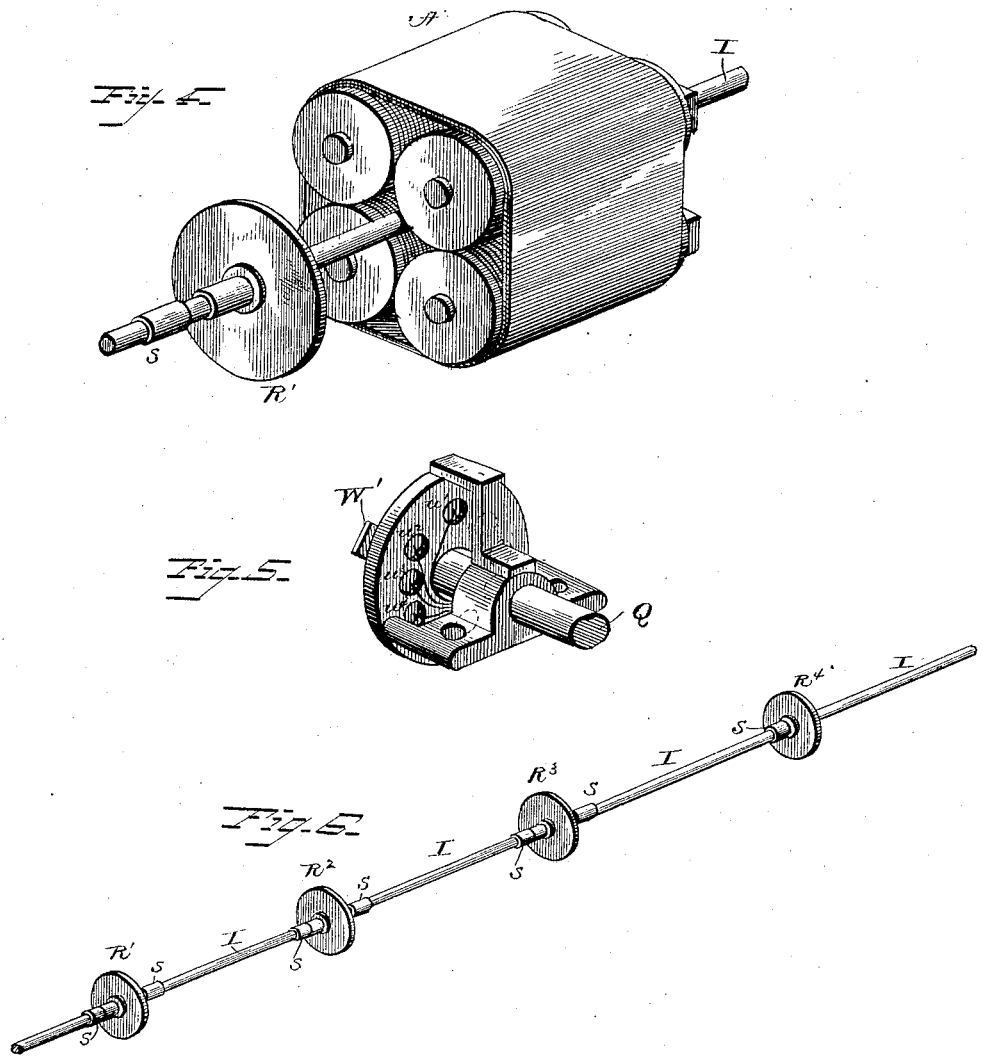
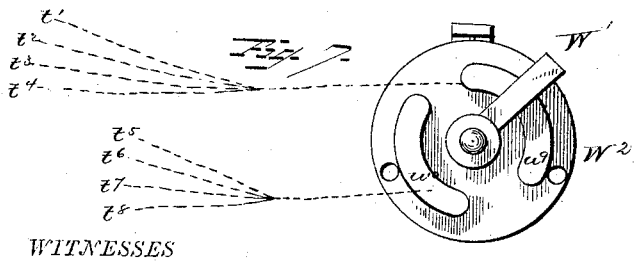
WITNESSES
F. L. Ourand
S. Nottingham
INVENTOR
Ernest Knabe, Jr.
By Leggett & Leggett
Attorney

UNITED STATES PATENT OFFICE.

ERNEST KNABE, JR., OF BALTIMORE, MARYLAND.

RECIPROCATING ELECTRO-MAGNETIC MOTOR.

SPECIFICATION forming part of Letters Patent No. 322,296, dated July 14, 1885.

Application filed August 2, 1884. (No model.)

*To all whom it may concern:*

Be it known that I, ERNEST KNABE, Jr., of Baltimore city, in the State of Maryland, have invented certain new and useful Improvements in Reciprocating Electro-Magnetic Motors; and I do hereby declare the following to be a full, clear, and exact description of the invention, such as will enable others skilled in the art to which it appertains to make and use the same.

My invention relates to an improved reciprocating electro-magnetic motor, its object being to secure a long stroke of the reciprocating member in this class of machines, whereby is prevented loss of power from frequent reversals of the motion and of electric current, and, further, to enable the crank-pin of a fly-wheel connected with said reciprocating member to be set far enough from the center to secure a highly-efficient leverage.

The invention consists in certain novel combinations and arrangements of devices, which may be fully understood from the following particular description, in connection with the accompanying drawings, in which—

Figure 1 is a side elevation of an electro-magnetic motor constructed according to my invention. Fig. 2 is a similar view of the opposite side. Fig. 3 is a plan view. Fig. 4 is a perspective view of one pair of magnets, a portion of the reciprocating rod, and an armature thereon. Fig. 5 is an enlarged perspective view of the commutator. Fig. 6 is a detached view of the reciprocating rod with its armatures. Fig. 7 is a view in elevation of a modified commutator.

The letter Y indicates a frame-work composed of parallel walls $y\, y$, supporting between them and near their tops a floor, $y'$, upon which are secured the pairs of electro-magnets A B C D, which drive the reciprocating rod I in one direction and the pairs of electro-magnets E F G H in the opposite direction. The poles of the magnets A face the poles of magnets E, and are separated therefrom by a suitable space. The poles of magnets B face the poles of the magnets F, and are separated therefrom by a space about twice as great as that which separates the magnets A and E. The magnets C and G face each other, and are about three times as far apart as A and E, and magnets D and H are similarly arranged relatively and about four times as far apart as A and E.

Additional pairs of magnets might be added to each series facing each other, the intervening spaces having successively an increment about equal to the distance between magnets A and E. Through the space between the magnets of the several pairs extends the reciprocating rod I, having a bearing for one projecting end in a standard, $k$, and having at the other end a cross-head, $l$, arranged to slide upon suitable guide-ways, $m\, m$. To this cross-head is pivoted one end of a pitman-rod, $n$, the other end of which is connected to a crank, $p$, of a fly-wheel, P, having its shaft Q mounted in suitable bearings or supports, $y^2\, y^2$.

Upon the reciprocating rod I are mounted armatures $R'\, R^2\, R^3\, R^4$, the last of which is fixed, while the others may slide freely on the rod within certain limits. One armature is arranged between each two facing groups of magnets. On each side of each of the loose armatures $R'\, R^2\, R^3$ a collar or shoulder, $s$, is fixed upon the reciprocating rod to limit the distance which said armatures may be shifted on the rod. The distance which the armature $R^3$ may be shifted on the rod is equal to the distance between the magnets A and E approximately. The armature $R^2$ may shift about twice this distance, and the armature $R'$ three times. It may possibly be more proper to say that the reciprocating rod slides through the armatures these distances rather than that the armatures are shifted upon the rod.

Each pair of magnets has its coils connected continuously, and one terminal from each pair connects with a common conductor, T, which is connected to a binding-screw, U. The opposite terminals are, by means of wires $t',\, t^2,\, t^3,\, t^4,\, t^5,\, t^6,\, t^7$, and $t^8$, connected, respectively, to the contact-buttons of a commutator or circuit-changer, W, the revolving metallic spring-arm W' of which is fixed to the end of the metallic shaft of the fly-wheel in such position that it will touch the buttons $w'\, w^2\, w^3\, w^4\, w^5\, w^6\, w^7\, w^8$ successively as it is carried around. A metallic spring, Z, bears upon the metallic shaft of the fly-wheel and is electrically connected with the binding-screw U'. The wire $t'$ from the magnets A leads to the contact-button $w'$; the wire $t^2$ from magnets B leads to the contact-button $w^2$, and so on, so that when the battery X has its poles connected to the binding-posts U and U' and the metallic arm of W' the commutator comes in contact with the respective buttons, a circuit will be established, as indicated by the arrows. For instance, the metallic spring-arm W' being in contact with the button $w'$, a circuit will be established from one pole of the battery to binding-screw U, thence to the conductor T, through the coils of magnets A, and over wire $t'$ to contact-button $w'$, and thence through arm W', the shaft of the fly-wheel, spring Z, and its connection to binding-screw U', and thence to battery. The current flowing over this circuit will charge the magnets A, and they will attract the armature R', so that it will press against the collar on the reciprocating rod and cause said rod to be moved in the direction of arrow No. 2 till the armature strikes the magnet-poles, at which time the arm W' will have passed to contact-button $w^2$, thus establishing the circuit through magnet B immediately after breaking it through magnets A. At this time the rod will have carried the armature $R^2$ within attracting distance of the magnets B, which, being charged by the current, will draw said armature against one of the collars on the rod and thus move the rod a farther distance, said rod sliding through the armature R'. When the armature $R^2$ strikes the poles of magnets B, the armature $R^3$ will have been brought within attracting distance of the magnets C, and the metallic arm of the commutator will have passed to button $w^3$ to establish the circuit through said magnets C, which will attract its armature and move the rod in the same direction as the previous magnets until its armature strikes its poles, at which time the commutator-arm W' will have passed to contact with button $w^4$, and the fixed armature $R^4$ will be brought within attracting distance of the magnets D, which in attracting said armature will finish the stroke of the reciprocating rod in the direction of the arrows No. 2. When this last armature strikes its magnet-poles, the arm W' of the commutator will come in contact with the button $w^5$ and close circuit through magnets E, which will attract armature R' to commence the return-stroke of the reciprocating rod, and the turning of the fly-wheel shaft will carry the commutator-arm to the buttons $w^6$ $w^7$ $w^8$ successively, thus causing the magnets E F G H to be successively energized to attract their armatures as they come within proper distance, the same as did magnets A B C D. It will be observed that as each armature is attracted to and strikes the poles of a group of magnets a stop or shoulder, $s$, is brought snugly up behind said armature. On the return-stroke the armatures remain in contact with the stops $s$, which were brought up in contact with their rear faces, and as the several armatures come within attracting distance of their respective magnets they are attracted by said magnets and transmit their motion to the rod through the stops. At the end of the stroke the stops $s$ of the rod on the front faces of the several armatures are brought up snugly in front of said armatures, and consequently prevent the several armatures from moving forwardly toward their respective magnets without imparting their motion to the rod.

The magnets A give the initial movement of the reciprocating rod in one direction, and the magnets E give the initial movement in the opposite direction, so that the armature R' after being attracted must remain stationary while all the other armatures are attracted and perform their movements successively. The stops or collars $s$ of the armatures are therefore a greater distance apart than any other two stops, for the purpose of permitting the rod to slide through said armature the distance equal to the entire movement of the last armature. The stops or shoulders for each armature are at such a distance apart as to allow the rod to slide through the armature after it (the armature) comes to rest while all the armatures which succeed it complete their movements, either as moved by the rod or as attracted to move it.

It will now be seen that the pairs of magnets A B C D act upon the rod successively through their armature to give it its stroke in one direction, and the pairs of magnets E F G H act successively to give the stroke in the opposite direction, and the rod being connected to the crank of the fly-wheel shaft by the pitman, said shaft is given a rotary motion, which may be transmitted to other machinery by any of the well-known means, as belting or gearing.

Although I have shown and heretofore described the commutator as having a separate contact-button for each pair of magnets, it is not essential that the commutator be so arranged. The circuit may be closed and the current pass simultaneously through all the magnets of either series.

In Fig. 6 the commutator $W^2$ has two metallic segments, $w^9$ $w^{10}$. All the wires $t'$ $t^2$ $t^3$ $t^4$ may terminate in one of said segments, and the similar wires from the other series of magnets may terminate at the other segment, the other arrangement of parts being as heretofore described, and it will be obvious that while the commutator-arm is in contact with one segment all the magnets will be energized; and although possibly but one will efficiently attract its armature, such armature will carry the rod I along to bring another armature within attractive distance of another magnet, and so on.

When the commutator-arm passes to the opposite segment, the other series of magnets will be energized, and after the first group has acted the others will attract their armatures successively as such armatures come within attracting distance.

Of course the groups of magnets need not each be limited to a single pair, as it is obvious that any number of magnets desirable might be included in each group, and there might be more than one reciprocating rod to carry the armatures.

There may be many other changes made in the apparatus without departing from its essential principle, and I therefore do not limit myself to any of the precise constructions shown.

I claim—

1. The combination, with the reciprocating rod, the fixed armature, and the loose armatures through which the rod has different distances of play, of the groups of oppositely-arranged magnets having their poles facing each other and toward the armatures, respectively, the said groups with facing poles being at successively-different distances apart, and an automatic commutator and connections arranged to change a battery-current from the magnets facing in one direction to those facing in the opposite direction, substantially as described.

2. The combination, with the suitably-supported series of magnets A B C D, having their poles facing in one direction, the series of electro-magnets E F G H, having their poles facing those of the said magnets A B C D, and separated therefrom by uniformly-differing spaces, of the reciprocating rod I, provided with the loose armatures $R'$ $R^2$ $R^3$ and the fixed armature $R^4$, the play of the rod through said loose armatures being limited in accordance with their positions with respect to their magnets, suitable circuit-connections, substantially as described, and automatic means operated by said rod for directing an electric current through the respective groups of magnets in each series successively for causing the armatures to be attracted alternately in opposite directions.

3. The combination, with the series of electro-magnets A B C D, having their poles facing in one direction, the series of magnets E F G H, having their poles facing in the opposite direction and separated by uniformly-differing distances in series from the poles of the first-named magnets, the reciprocating rod I, having the loose armatures and one fixed armature, the fly-wheel having a metallic shaft provided with a crank, the pitman connecting the reciprocating rod with said crank, the commutator having the contact-buttons insulated from each other, the metallic commutator-arm carried by said shaft and arranged to strike said buttons successively, the metallic brush or wiper bearing on said shaft, and the conductors including the coils of the magnets and arranged for circuit-connection, essentially as set forth.

In testimony whereof I have signed this specification in the presence of two subscribing witnesses.

ERNEST KNABE, Jr.

Witnesses:
W. S. WILKINSON,
JAMES E. WILKINSON.